April 17, 1934.  R. C. BENDER  1,954,981
HEATING AND HUMIDIFYING DUST FILTER
Filed Sept. 27, 1930  5 Sheets-Sheet 1
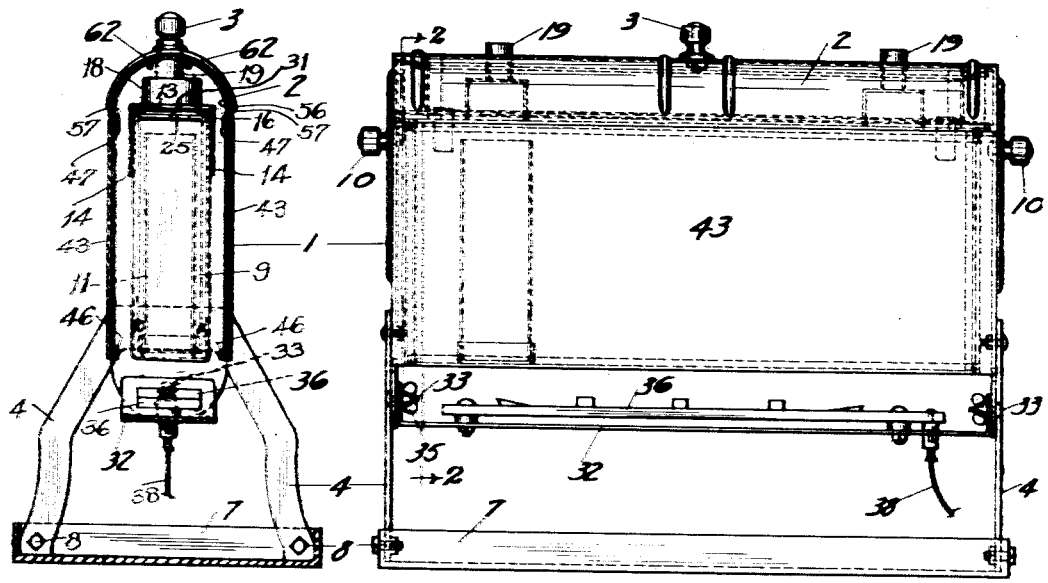
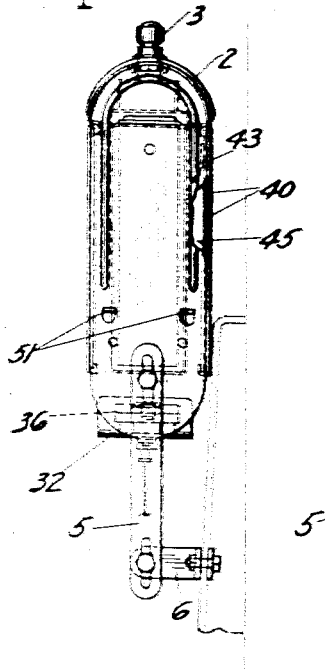
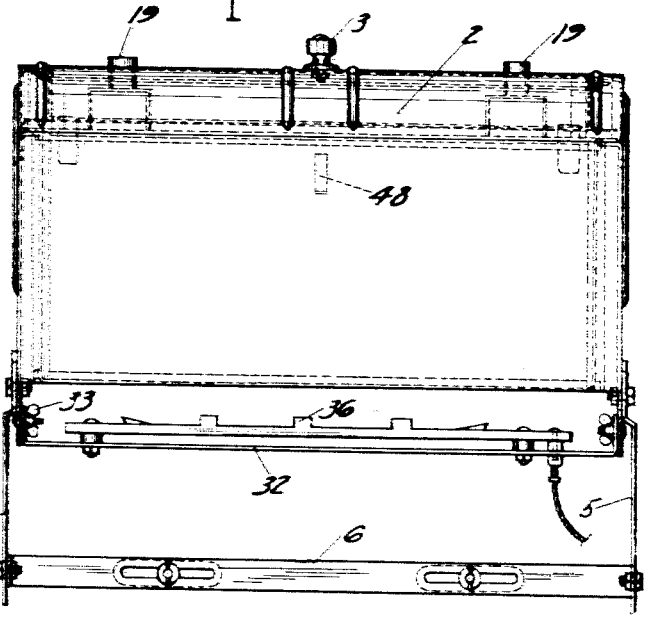
R. C. BENDER Inventor
By Merrill M. Blackburn
Attorney April 17, 1934.   R. C. BENDER   1,954,981
HEATING AND HUMIDIFYING DUST FILTER
Filed Sept. 27, 1930   5 Sheets-Sheet 2

R. C. BENDER Inventor

By Merrill M. Blackburn.
Attorney

April 17, 1934. R. C. BENDER 1,954,981
HEATING AND HUMIDIFYING DUST FILTER
Filed Sept. 27, 1930 5 Sheets-Sheet 4
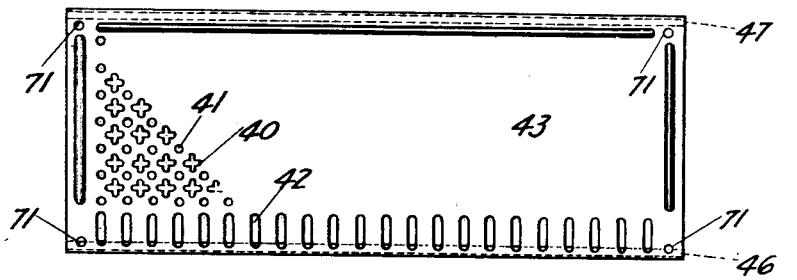 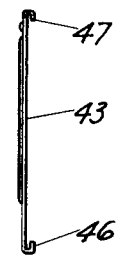
FIG-15 FIG-16
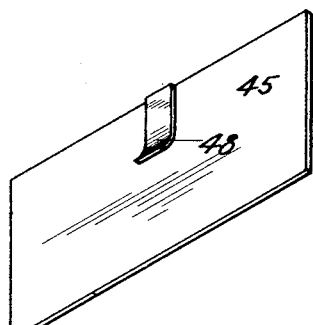 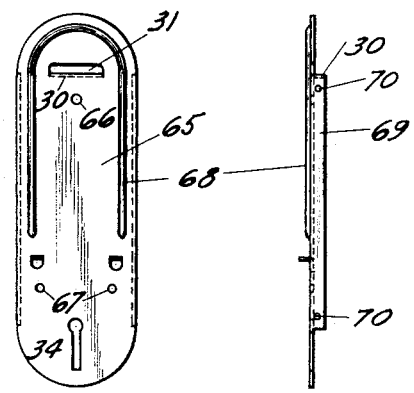
FIG-17 FIG-18 FIG-19
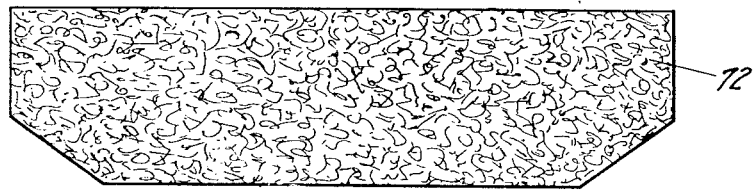 
FIG-20 FIG-22
R. C. BENDER Inventor
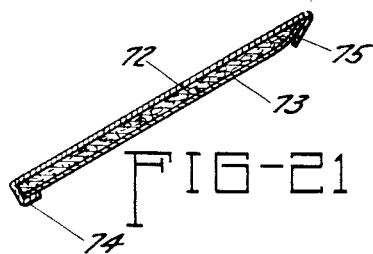
FIG-21
By Merrill M. Blackburn

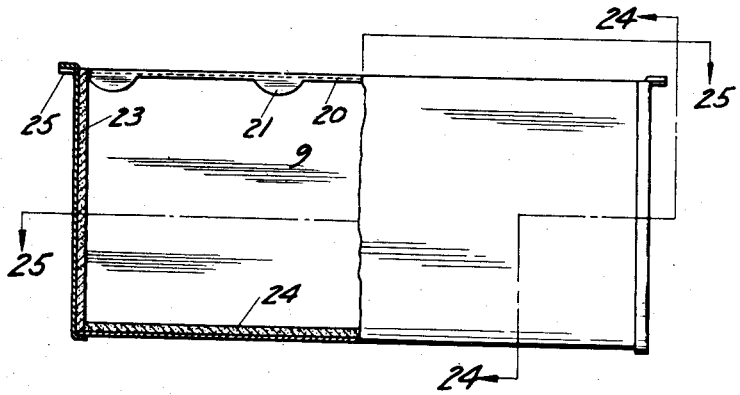
FIG-23
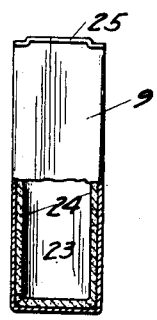
FIG-24
FIG-25
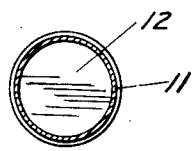
FIG-28
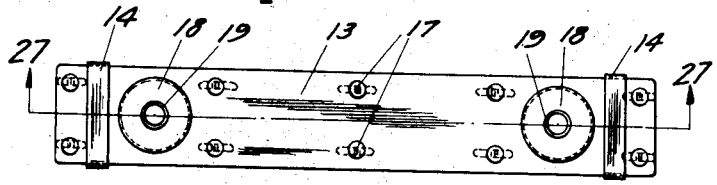
FIG-26
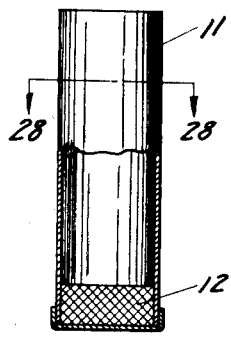
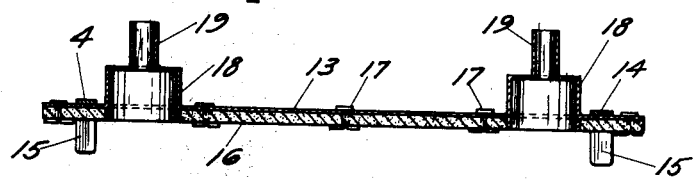
FIG-27
FIG-29

Patented Apr. 17, 1934

1,954,981

UNITED STATES PATENT OFFICE 1,954,981

HEATING AND HUMIDIFYING DUST FILTER

Robert C. Bender, Davenport, Iowa

Application September 27, 1930, Serial No. 484,922

9 Claims. (Cl. 183—49)

The present invention pertains to a humidifier and dust collector for use in connection with floor or wall registers, where a warm air furnace is used, or without reference to any register at all and contemplates making use of an electric heater attachment under certain conditions. In the latter case, a heater may be set anywhere in the room, as desired, and need not necessarily be in the vicinity of any register.

The present invention is a development from and an improvement upon several prior structures upon which I have filed applications and among the objects of this invention are to improve in general upon the constructions shown in such prior applications; to produce a device which, by the attachment or removal of several simple parts, may be converted from one type of humidifying and dust collecting device to another or converted from a humidifier to a heater or vice versa; to provide a device which is convertible from what is essentially a dust collector and humidifier into what is essentially a heater or what is essentially a combined heater and humidifier or what is essentially a dust collector and heater; to provide a device which has a wide variety of uses of the character indicated, merely by the addition or subtraction of a few simple parts; and such further objects, advantages and capabilities as will hereafter appear and as are inherent in the construction disclosed herein. My invention further resides in the combination, construction and arrangement of parts illustrated in the accompanying drawings and, while I have shown therein what is now considered the preferred form of my device, together with various modifications thereof, I desire my present disclosure to be interpreted as illustrative rather than in a limiting sense.

Figures 5, 6:
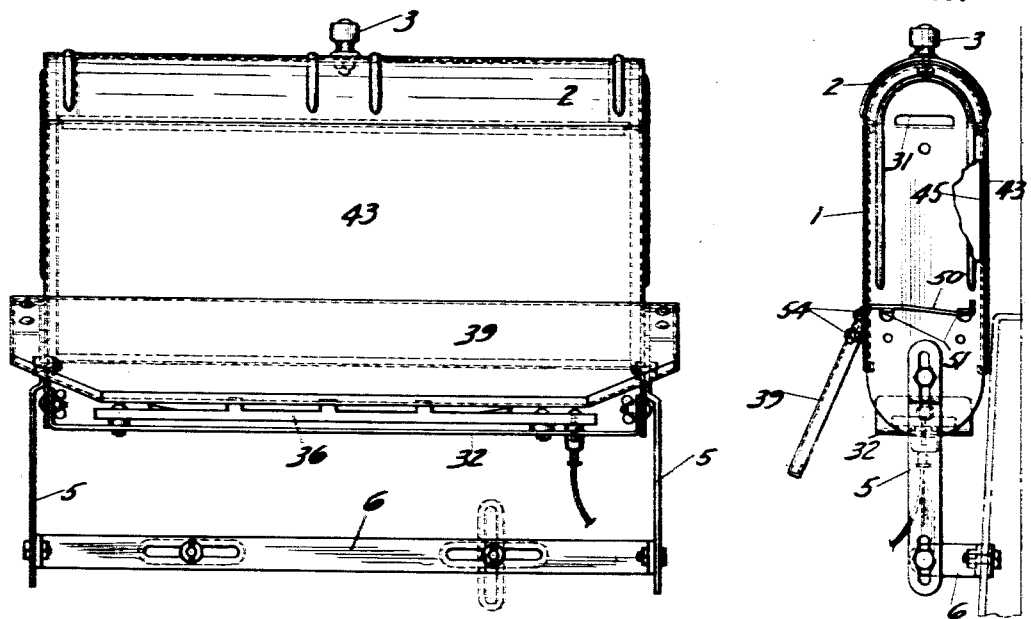
Figure 7:
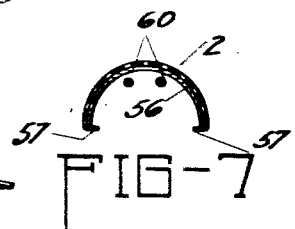
Figures 8, 9:
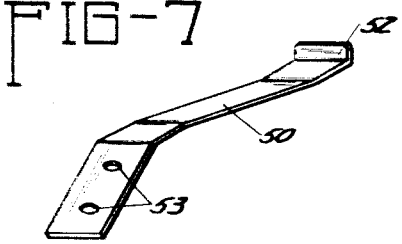
Figures 10, 11:
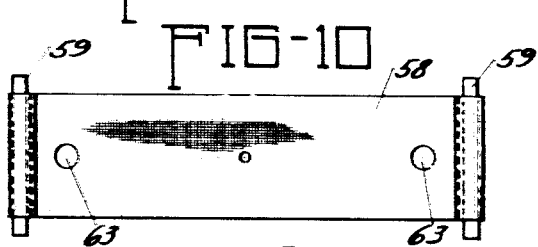
Figure 10A:
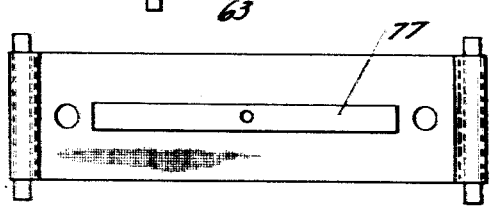
Figure 12:
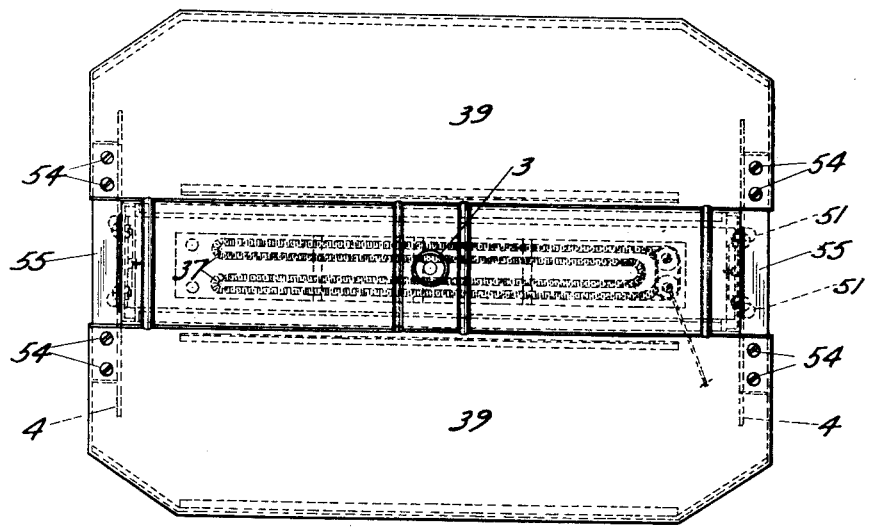
Figures 13, 14:
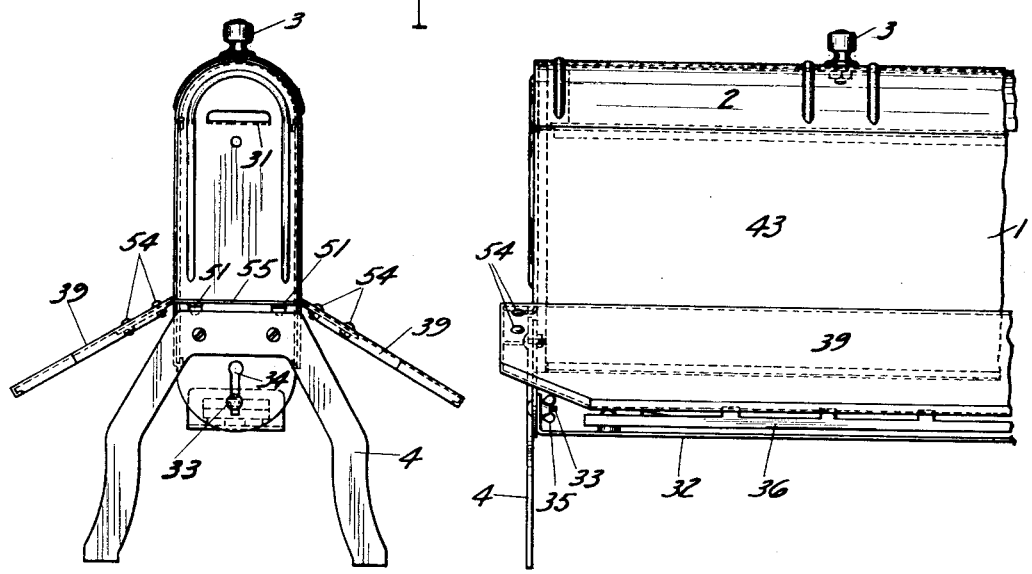

In the drawings annexed hereto and forming a part hereof, Fig. 1 is a side elevation and Fig. 2 an end elevation of one embodiment of my invention, designed to be placed upon a floor; Figs. 3 and 4 are similar views of another embodiment of this invention illustrated as being attached to a wall register; Figs. 5 and 6 are views similar to Figs. 3 and 4 and showing the construction as having an air deflector apron attached in front of same; Fig. 7 is a cross section through the cover of this device, showing the same as having a thin sheet metal liner mounted therein; Fig. 8 is a detail of a connecting member for use in an arrangement such as shown on sheet 3 of the drawings; Fig. 9 is a similar detail of a mounting for an apron as shown in edge view in Fig. 6; Fig. 10 is a plan view of a filtering fabric to be inserted in the cover shown in Fig. 7 in place of the sheet metal liner shown in this figure; Fig. 10A is a modified device for holding the fabric against the cover; Fig. 11 is a detail of a supporting rod for the fabric shown in Fig. 10, the position of the rod being indicated in Fig. 6; Fig. 12 is a plan view of a humidifier and dust collector to be placed on the floor over a floor register and having a pair of dust collecting deflecting aprons arranged upon opposite sides thereof; Fig. 13 is an end view and Fig. 14 is a fragmentary side elevation of the structure shown in Fig. 12; Fig. 15 is a face view and Fig. 16 an end view of one of the side plates used in the building up of such structures as those shown in Figs. 1 to 6 and 12 to 14, it being understood that only a portion of the perforations are shown; Fig. 17 is a perspective view of a lining plate inserted within the casing, more particularly when the device is to be used in close proximity to a wall, as shown in Figs. 3 and 4; Fig. 18 is a face view and Fig. 19 an edge view of an end of the casing; Fig. 20 is a plan view of a dust collecting pad used in the building of my construction; Fig. 21 is a cross section through one of the aprons showing how the dust collecting pad is mounted therein and held in place; Fig. 22 is a perspective view of a strip used to hold the dust collecting material in place, as illustrated in Fig. 21; Fig. 23 is a broken sectional elevation of a water can used when the device is to be used as a humidifier; Fig. 24 is a broken sectional elevation substantially along the plane indicated by the line 24—24, Fig. 23; Fig. 25 is a broken plan section substantially along the plane indicated by the line 25—25, Fig. 23; Fig. 26 is a plan view of a cover placed over the water container shown in Fig. 23; Fig. 27 is a longitudinal section substantially along the plane indicated by the line 27—27, Fig. 26; Fig. 28 is a horizontal section substantially along the plane indicated by the line 28—28, Fig. 29; Fig. 29 is a broken sectional elevation of a deodorant container to be placed inside of the water container illustrated in Fig. 23.

Reference will now be made in greater detail to the annexed drawings wherein my invention is shown in various forms and combinations. In these drawings, the heater casing is denoted by the numeral 1 and its cover by the numeral 2. The cover is shown as having a handle 3 by means of which it may be handled when this is necessary. The heater casing may be supported by various types of supporting means, such as legs 4 secured to the ends of the casing, or arms 5 adjustably secured thereto and to a bracket 6. In Figs. 1 and 2 the legs 4 are shown as secured to a tray 7 by means of bolts 8, the tray serving to prevent scorching of floors or rugs when used as a heater and to assist in preventing the device from being tipped over. The container or can 9 is illustrated in Figs. 23, 24 and 25 and is indicated in dotted outline in several other figures. Handles 10 may be provided at the ends of the casing by means of which the same may be lifted and carried from place to place. Reference will now be made more particularly to sheet 5 of the drawings wherein the deodorant container 11 is shown as being provided at its closed end with a weight 12 which will serve to keep the container right end up in the humidifier can, when used as illustrated in Figs. 1 and 2. A cover 13, illustrated in Figs. 26 and 27, is provided for the humidifier can 9 and fits down tightly over the top. It is provided with clamps 14 having downwardly projecting ends 15 which engage the sides of the can 9. These therefore hold the cover 13 correctly positioned on top of the can, thus assuring that the latter will be kept closed at all times. This cover includes a pad 16 on its under side which is secured thereto in any suitable manner, as by fasteners 17. This pad has openings cut therein through which extend the lower extremities of the caps 18 which serve as collecting chambers for the liquid evaporated from the container 9. These caps 18 are provided with chimneys 19 which extend upwardly through the cover 2 as illustrated in Figs. 1 and 3. The cover 13, being mounted closely adjacent the top of the container 9 and spaced away from the cover 2, tends to prevent the vaporized liquid from coming in contact with the inner surface of the metal of any part of the outer container. This is assisted by the caps 18 and delivery tubes 19 which carry the steam through the cover without contact with the metal thereof. The pad 16 has a tendency to absorb the moisture evaporated from the surface of the liquid in the can 9 and also, fitting closely on top of this can, it tends to prevent escape of the liquid between the top of the can and the under side of the cover 13. This cover is an important essential when the device is used as an electric humidifier and deodorizer.

Referring again to Figs. 23, 24 and 25, it will be seen that the top edges of the can 9 are turned over into narrow flanges 20 having spaced downwardly extending ears 21 at intervals along the length thereof. These serve to hold the absorbent lining of the can in place at its upper edges. Certain notches 22 will be noted at the ends of the flanges 20, as illustrated in Fig. 25, these notches serving to receive the lining pieces 23 for the ends of the can. The absorbent lining 24 extends downwardly on opposite sides of the can 9 and across the bottom thereof. The two longitudinal edges thereof are tucked under the ears 21 and flanges 20. After this pad 24 is inserted in place in the can, the end pieces 23 are shoved downwardly into place as illustrated in Fig. 23 and they are then held in place by the ends of the lining 24. Flanges 25 are turned outwardly at the upper ends of the can 9 and serve to support the same upon the brackets 30 formed in the ends of the casing by partly punching out and pressing inwardly portions of the metal as indicated by the openings 31 shown most clearly in Figs. 6, 13 and 18.

A support 32 is illustrated as having its ends turned up, said ends being perforated for the reception of bolts 33 which extend through key-hole slots 34 in the ends of the casing 1. These bolts are provided with wing nuts 35 whereby they may be rigidly but adjustably secured in place with relation to the bottom of the fluid container 9. An insulating bar 36 is spaced from the support 32 and carries an electric heating unit 37 of any suitable type. Inasmuch as the specific construction of the heating unit forms no part of the present invention but is to be presented in a separate application, the details thereof are not disclosed in the present drawings. A conductor 38 leads from the ends of the electric heating unit to any suitable source of electric current in order that the current may be supplied thereto to cause energization of the heating unit. This heating unit, comprising the parts 32 to 38, constitutes one of the accessories which may be used in connection with the casing 1. As illustrated in Figs. 1 and 2, the device is intended to be used as an electric heater and humidifier without reference to any external source of heat such as a floor or wall register. Fig. 13 shows the same arrangement except that the tray 7 is omitted and the aprons 39 are added. This is intended for use with a floor register, either when heat is being delivered through the register or not. If sufficient heat is being furnished by the furnace, it is unnecessary to use the electric heater and this may be detached entirely.

The structure illustrated in Figs. 3 and 4 is similar to that illustrated in Figs. 1 and 2 but is illustrated in connection with a wall register rather than a floor register, as in the case of Figs. 13 and 14. If it is winter time and sufficient heat is coming from the furnace so that the electric heater is not needed, the same may either be detached from the casing 1 or the heating unit may be disconnected from the source of electric current. While the perforations 40, 41 and 42 (Fig. 15) are not shown in any of the other figures, it will be understood that the front and back sides 43 of the casing 1 and the aprons 39 are provided with such perforations. It will also be understood that when this device is used in connection with a wall register, means must be provided for closing these openings 40 or the air flowing therethrough and against the wall will be liable to cause discoloration of the wall surface. For this reason, I provide plates 45 which may be inserted inside of the casing and sprung into position between the flanges 46 and 47 at the top and bottom edges of the plates 43. The flanges 46 and 47 are shown particularly well in Fig. 16, while the plate 45 is illustrated in Fig. 17. A finger piece 48 is attached to the plate 45 and serves as means whereby this plate may be buckled to be removed from the flange 47 when it is desired to take such plate out of the casing 1. It is apparent from the foregoing that when a solid plate 45 is inserted on the inside of the plate 43 which forms a side of the casing 1 adjacent the wall this plate 45 will prevent the escape of air through the openings 40, 41 and 42, thus keeping smoky or dirty air coming from the furnace from reaching the wall adjacent the air purifier.

As illustrated in Figs. 4 and 6, this device may be used either with or without the aprons 39 and may also be used either with or without the humidifier tank 9, Fig. 4 showing the use of this tank and Fig. 6 the omission thereof. In Fig. 6 there is illustrated a single apron 39 mounted on the container 1 by means of a pair of brackets 50, suitable ears 51 being punched out from the ends of the container 1 to receive and hold the brackets 50. One of these brackets is illustrated in perspective in Fig. 9 in which it is shown that at one end this bracket is provided with a hook 52 to prevent the same from being inadvertently detached from the ears 51. The opposite end portion of this bracket is provided with perforations 53 intended to receive bolts 54 whereby the body of the apron is attached to the brackets. When it is desired to use a pair of aprons 39 upon opposite sides of the container 1, as illustrated on Sheet 3, a bracket 55, such as illustrated in Fig. 8, is made use of. The apron bodies are bolted to the ends of these brackets which rest upon the ears 51, thus suspending the aprons upon opposite sides of the container.

As illustrated in Fig. 7, the cover 2 is provided with perforations similar to the perforations 40 and 41 and may have a thin sheet metal liner 56 therein having its edges mounted upon the flanges 57. This will therefore prevent air from passing out through the cover, compelling same to pass outwardly through the perforations in the side wall or walls 43.

If it is desired to permit the air to pass out through the cover, a fabric band 58 having end strips 59 of metal or other resilient substance may be placed inside of the cover with the ends of the strips 59 resting on the flanges 57 and the fabric held up against the inside of the cover. In order to prevent the middle portion thereof from sagging and hanging down a pair of rods 60 having offset ends 61 may be fastened to the under side of the ends of the cover 2, as indicated at 62 in Fig. 2. The central portion of these rods will be spaced downwardly far enough below the cover to permit the strip 58 to be inserted between the cover and rods. It is apparent that with this arrangement the fabric strip will be held up substantially against the under side of the cover. Openings 63 are formed in the fabric 58 to receive the pipes 19 when the cover is set down on the casing. The strip 58 is intended for use when the device is used as a humidifier or dust collector, either of the floor or wall type, while the metal strip 56 is intended primarily for use when the device is being used as a heater only.

Fig. 10A illustrates another manner of holding the strip 58 up against the cover 2 which comprises passing the bolt of handle 3 through a narrow metal strip 77 on the under side of fabric 58 and then tightening up the nut on the bolt.

As shown on Sheet 4 of the drawings the heater casing 1 may be assembled by attaching a pair of side plates 43 to a pair of end plates 65 and then attaching suitable supporting means, either legs 4 or brackets 5. The opening 66 just below the opening 31 is for the reception of the bolt or rivet passing through the handle member 10, while the holes 67 are intended to receive the bolts whereby the legs 4 are attached to the ends of the casing. Reinforcing ribs 68 are shown in Figs. 18 and 19. Flanges 69 are shown in the latter figure as being provided at the lateral edges of the end plates 65 and as having perforations 70 therein for reception of bolts passed through openings 71 in the side plates 43. It is thus apparent that the operation of securing these parts together to build up the container is a very simple one.

The dust collecting pad 72 is formed by placing several layers of steel wool, one on top of another, in a suitable holder, and then compacting same until a pad of suitable density has been secured. This is then trimmed to the shape shown in Fig. 20 and attached to the perforated metal cover to form the dust collecting apron 39. Attachment of the dust pad to the metal is made by means of a plurality of resilient metal strips 73 (Fig. 22), the ends of which are slipped under or inside of the flanges 74 and 75 along the edges of the metal plate of apron 39. This is done after the pad 72 has been put in place therein. Fig. 21 is a central cross section of such an arrangement and shows the pad 72 held in place by means of strips 73.

The electric heater attachment is intended for use primarily in late spring or early fall in connection with floor or wall registers and also may be used in combination with the humidifying can and cover therefor, without an absorbent lining in the liquid container and without dust collecting devices, where moisture or a deodorant may be required or as a stationary or portable heater without the humidifying container or dust collecting devices. In the latter instance the blank sleeve or imperforate liner sheet should be used in the cover.

While I have not referred above to all of the possible combinations, of the various elements shown in the present drawings, I desire it understood that it is the intention to use these various parts in various combinations depending upon the circumstances and that the combinations built up will depend upon the particular conditions to be met and the particular desire of the user. It is also understood that the combinations of these devices may vary with the seasons and therefore that my claims should not be limited except as required by the particular language used therein.

Having now described my invention,
I claim:

1. In a structure of the character indicated, a filtering unit comprising a perforated metallic plate having retaining grooves along two opposite edges and a layer of filtering material on the face of the metal between the grooves, and flexible retaining strips having their ends in said grooves, said retaining strips holding the filtering material against the face of the metal.

2. A structure as defined in claim 1 in which the filtering material is composed of steel wool compressed under pressure.

3. In a structure of the character described, a casing, a container loosely suspended therein, a cover for said container having a soft pad on its under surface to contact with the upper edge of the container, said cover having venting devices extending therethrough and connecting the interior of the container with the exterior of the casing.

4. In a structure of the character described, a casing having a cover, means to support said casing in an upright position, a fabric liner in the cover, a fluid container suspended in said casing and spaced from the wall thereof, and a pair of aprons suspended externally of said casing upon opposite sides thereof, said aprons having air filtering means attached thereto for removing solid particles carried by the air passing therethrough.

5. A structure of the character indicated comprising a casing, a perforate cover therefor, a liquid container in the casing, supporting means for the casing, a venting member extending through the cover and opening at one end into the liquid container and at its other end into the atmosphere above the casing, a fabric liner mounted inside of the cover and extending substantially the entire length and width thereof, there being means to support the central portion of the liner substantially in contact with the inside of the cover.

6. A structure of the character indicated comprising a casing, a perforate cover therefor, a liquid container in the casing, supporting means for the casing, a venting member extending through the cover and opening at one end into the liquid container and at the other end into the atmosphere above the casing, and a fabric liner for the cover supported at its ends and central portion by metallic strips which hold the liner substantially in contact with the cover.

7. An air moistener for a room comprising a casing having end and side walls, a perforate cover therefor, a liquid container detachably suspended in the casing upon the end walls thereof, supporting means for the casing, and a venting member extending through the cover and opening at one end into the liquid container and at its other end into the atmosphere above the casing.

8. A structure as defined by claim 7 having a sheet metal cover for the liquid container extending the entire length and width thereof, said cover having a pad on its under surface to contact with the upper edge of the liquid container and retain vapor therein, and said venting member extending through both of the covers.

9. A structure of the character described, comprising a perforate casing adapted to receive at its lower portion an electrical heating attachment, a perforate cover for said casing and a removable imperforate metal lining sheet within said cover, a removable imperforate metal sheet on one face of said casing to prevent the air from passing therethrough and cause it to pass through other parts thereof, supporting means for maintaining the casing in an upright position, said means comprising a bar for attachment to a wall register and brackets to connect the casing with the bar, said bar and brackets being slotted for vertical and lateral adjustment of the casing with relation to the register, said casing having a filtering perforated metal plate suspended from one face thereof, extending externally and downwardly of said casing, said plate having air filtering means attached thereto for removing solid particles carried by the air passing therethrough.

ROBT. C. BENDER.